(12) United States Patent
Gil et al.

(10) Patent No.: US 9,880,748 B2
(45) Date of Patent: Jan. 30, 2018

(54) BIFURCATED MEMORY MANAGEMENT FOR MEMORY ELEMENTS

(71) Applicant: QUALCOMM Incorporated, San Diego, CA (US)

(72) Inventors: Amit Gil, Zichron Yaakov (IL); Assaf Shacham, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 14/621,874

(22) Filed: Feb. 13, 2015

(65) Prior Publication Data

US 2016/0239218 A1    Aug. 18, 2016

(51) Int. Cl.
 *G06F 12/02* (2006.01)
 *G06F 3/06* (2006.01)
 *G06F 9/50* (2006.01)
 *G06F 13/16* (2006.01)

(52) U.S. Cl.
 CPC .......... *G06F 3/0611* (2013.01); *G06F 3/0659* (2013.01); *G06F 3/0679* (2013.01); *G06F 9/50* (2013.01); *G06F 12/0246* (2013.01); *G06F 13/1668* (2013.01); *G06F 2212/1024* (2013.01); *G06F 2212/7201* (2013.01); *G06F 2212/7202* (2013.01)

(58) Field of Classification Search
 CPC .. G06F 3/0611; G06F 13/1668; G06F 3/0679; G06F 3/0659; G06F 12/0246; G06F 9/50; G06F 2212/7201; G06F 2212/1024; G06F 2212/7202
 See application file for complete search history.

(56) References Cited

U.S. PATENT DOCUMENTS

| 6,629,192 B1 * | 9/2003 | Schaefer .............. G06F 9/4401 711/103 |
| 8,037,234 B2 | 10/2011 | Yu et al. |
| 8,438,453 B2 | 5/2013 | Post et al. |
| 8,650,446 B2 | 2/2014 | Byom et al. |

(Continued)

FOREIGN PATENT DOCUMENTS

WO    2010060902 A1    6/2010

OTHER PUBLICATIONS

International Search Report and Written Opinion for PCT/US2016/012987, dated Apr. 8, 2016, 11 pages.

(Continued)

*Primary Examiner* — Arpan P. Savla
(74) *Attorney, Agent, or Firm* — Withrow & Terranova, PLLC

(57) ABSTRACT

Bifurcated memory management for memory elements techniques are disclosed. In one aspect, a memory element includes a self-managed portion and a portion that is managed by a remote host. Software that needs low latency access may be stored in the portion of the memory element that is managed by the remote host and other software may be stored in the portion of the memory element that is managed by the memory element. By providing such bifurcated memory management of the memory element, a relatively inexpensive memory element may be used to store software while at the same time allowing low latency (albeit at low throughputs) access to sensitive software elements with minimal bus logic.

27 Claims, 5 Drawing Sheets

(56) References Cited

U.S. PATENT DOCUMENTS

| | | | |
|---|---|---|---|
| 2008/0189485 A1* | 8/2008 | Jung | G06F 12/0246 |
| | | | 711/115 |
| 2009/0271563 A1 | 10/2009 | Gopalan et al. | |
| 2010/0049988 A1* | 2/2010 | Birman | G06F 21/62 |
| | | | 713/189 |
| 2010/0161886 A1* | 6/2010 | Toelkes | G06F 12/0246 |
| | | | 711/103 |
| 2011/0041005 A1* | 2/2011 | Selinger | G06F 11/10 |
| | | | 714/719 |
| 2011/0041039 A1 | 2/2011 | Harari et al. | |
| 2011/0307762 A1* | 12/2011 | Tiziani | G06F 11/10 |
| | | | 714/768 |
| 2014/0215129 A1 | 7/2014 | Kuzmin et al. | |
| 2016/0077959 A1* | 3/2016 | Quach | G06F 12/0246 |
| | | | 711/102 |

OTHER PUBLICATIONS

Second Written Opinion for PCT/US2016/012987, dated Feb. 7, 2017, 6 pages.

International Preliminary Report on Patentability for PCT/US2016/012987, dated May 11, 2017, 17 pages.

* cited by examiner

US 9,880,748 B2

BIFURCATED MEMORY MANAGEMENT FOR MEMORY ELEMENTS

BACKGROUND

I. Field of the Disclosure

The technology of the disclosure relates generally to memory elements and particularly to management of memory elements.

II. Background

Computing devices rely on memory and software stored therein to enable many functions. Mobile computing devices, such as smart phones, are one example of a computing device that uses software stored in memory to enable many functions. One such function is the control of the wireless modems that enable wireless communications. While such functionality could be enabled in strictly hardware, such an implementation may be unnecessarily complex, difficult to upgrade, hard to test and space prohibitive. Thus, some amount of functionality will be instantiated through software, and the device must have appropriate memory to store the software.

As noted above, one such function that is typically software enabled is the functionality of the wireless modem(s) of the mobile computing devices. While different portions of the industry may refer to such software by different terms, as used herein, such software is referred to as the modem subsystem (MSS) code. The MSS code is relatively large and must be accessed with some regularity with low latency. In some devices, the MSS code may be stored in direct random access memory (DRAM). However, DRAM is relatively expensive, and such expense may render the device commercially unattractive in the highly competitive mobile computing device market.

Some designers may move the MSS code to a remote memory element, such as a negative AND (NAND) storage element. However, NAND storage elements typically have too much latency to be practical. Thus, designers need improved techniques to allow low latency, relatively inexpensive access to software such as the MSS code.

SUMMARY OF THE DISCLOSURE

Aspects disclosed in the detailed description include bifurcated memory management for memory elements. In particular, exemplary aspects of the present disclosure propose a memory element that includes a self-managed portion and a portion that is managed by a remote host. Software that needs low latency access may be stored in the portion of the memory element that is managed by the remote host and other software and/or additional files (e.g., media files, user settings) may be stored in the portion of the memory element that is managed by the memory element. By providing such bifurcated memory management of the memory element, a relatively inexpensive memory element may be used to store software while at the same time allowing low latency (albeit at low throughputs) access to sensitive software elements with minimal bus logic.

In this regard in one aspect, a method of controlling a memory element is disclosed. The method comprises generating, at a host, a first instruction for a managed portion of a memory element. The method also comprises associating the first instruction with a logical address of the memory element. The method also comprises transmitting the first instruction to the managed portion of the memory element through a communication bus using a bus protocol. The method also comprises generating, at the host, a second instruction for an unmanaged portion of the memory element. The method also comprises associating the second instruction with a physical address of the memory element. The method also comprises transmitting the second instruction to the unmanaged portion of the memory element through the communication bus using the bus protocol.

In another aspect, a method of operation for a memory element is disclosed. The method comprises receiving, from a communication bus using a bus protocol, a first instruction from a host, the first instruction including a logical address for a managed portion of a memory element. The method also comprises receiving, from the communication bus using the bus protocol, a second instruction from the host, the second instruction including a physical address for an unmanaged portion of the memory element.

In another aspect, a memory element is disclosed. The memory element comprises a controller. The memory element also comprises a first storage space configured to be managed by the controller. The memory element also comprises a second storage space configured to be managed by a host remotely from a memory element.

In another aspect a host is disclosed. The host comprises a bus interface configured to be coupled to a communication bus. The host also comprises a transceiver operatively coupled to the bus interface. The host also comprises a controller operatively coupled to the transceiver. The controller is configured to generate a first instruction for a managed portion of a memory element. The controller is also configured to associate the first instruction with a logical address of the memory element. The controller is also configured to instruct the transceiver to transmit the first instruction to the managed portion of the memory element through the communication bus using a bus protocol. The controller is also configured to generate a second instruction for a unmanaged portion of the memory element. The controller is also configured to associate the second instruction with a physical address of the memory element. The controller is also configured to instruct the transceiver to transmit the second instruction to the unmanaged portion of the memory element through the communication bus using the bus protocol.

DETAILED DESCRIPTION

Figure 1:
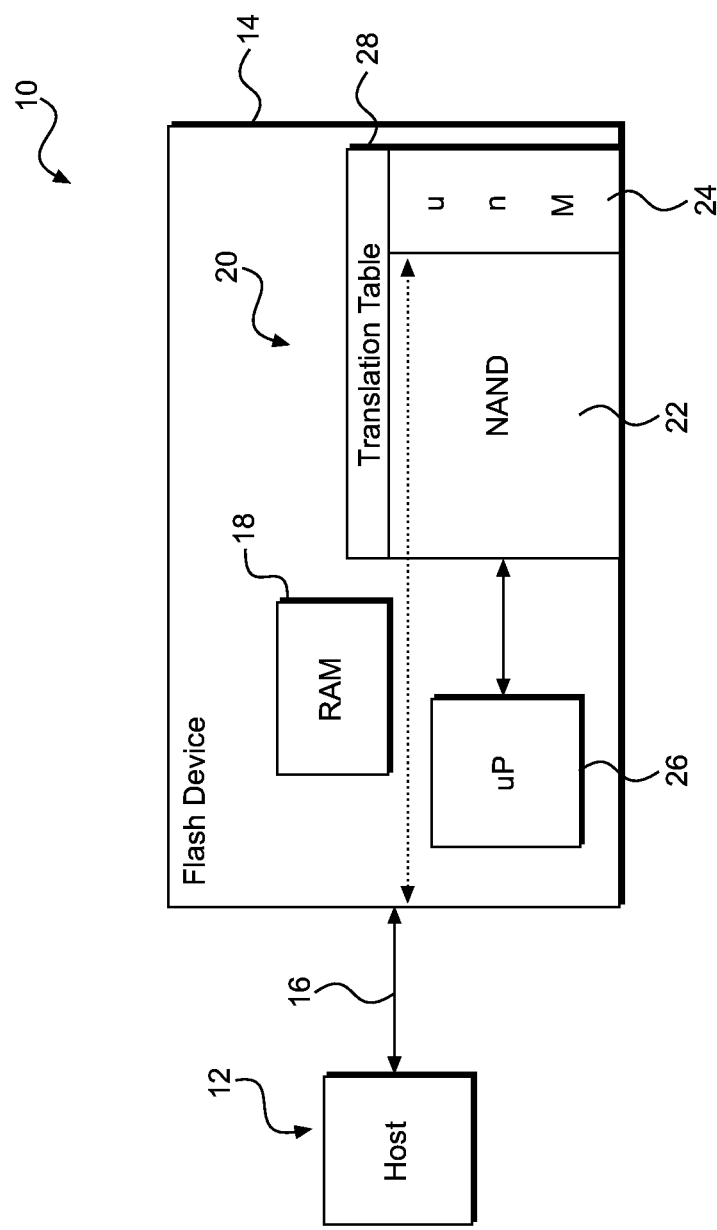
FIG. 1 is a block diagram of a system having a host and memory system according to an exemplary aspect of the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include bifurcated memory management for memory elements. In particular, exemplary aspects of the present disclosure propose a memory element that includes a self-managed portion and a portion that is managed by a remote host. Software that needs low latency access may be stored in the portion of the memory element that is managed by the remote host and other software and/or additional files (e.g., media files, user settings) may be stored in the portion of the memory element that is managed by the memory element. By providing such bifurcated memory management of the memory element, a relatively inexpensive memory element may be used to store software while at the same time allowing low latency (albeit at low throughputs) access to sensitive software elements with minimal bus logic.

In this regard, FIG. 1 is a block diagram of a system 10 having a host 12 and memory system 14 according to an exemplary aspect of the present disclosure. The host 12 may communicate with the memory system 14 through a communication bus 16. In an exemplary aspect, the memory system 14 is a flash device. The memory system 14 may include a random access memory (RAM) portion 18 as well as a memory element 20. In an exemplary aspect, the memory element 20 is a negative AND (NAND) memory element and has two portions. The first portion is a managed portion 22, and the second portion is an unmanaged portion 24 (also labeled unM on FIG. 1). The managed portion 22 is managed by a microprocessor (uP) 26 within the memory system 14 and the unmanaged portion 24 is managed by the host 12. In contrast to memory systems that are completely managed internally, exemplary aspects of the present disclosure provide low latency for the unmanaged portion 24. Likewise, in contrast to memory systems that are completely managed by the host, exemplary aspects of the present disclosure provide high throughput and device management for bulk storage space. Further, by only allocating the unmanaged portion 24, the burden on the host 12 is limited.

With continued reference to FIG. 1, in an exemplary aspect, the size and parameters of the unmanaged portion 24 are set when the memory system 14 is integrated into a device containing the host 12 and the memory system 14 (e.g., a mobile phone). In an exemplary aspect, the managed portion 22 is larger than the unmanaged portion 24. In another exemplary aspect, the unmanaged portion 24 is only large enough to house the modem system software (MSS) code. Thus, most of the memory system 14 is managed by the microprocessor 26 and not affected by the unmanaged portion 24. Further, the host 12 is responsible for managing the unmanaged portion 24 by running flash translation layer (FTL) software on it. In use, there are two types of read/write access commands. When the host 12 wants to read from or write to the unmanaged portion 24, the host 12 uses the physical address, which helps guarantee low latency. When the host 12 wants to read from or write to the managed portion 22, the host 12 uses the logical address, and the microprocessor 26 provides address translation to translate the logical address received from the host 12 to a physical address of the managed portion 22. In an exemplary aspect, the host 12 may encode the commands on the communication bus 16 in a way that tells the memory system 14 whether the command uses a logical or physical address. Further, the microprocessor 26 executes the FTL for the managed portion 22.

Figure 2:
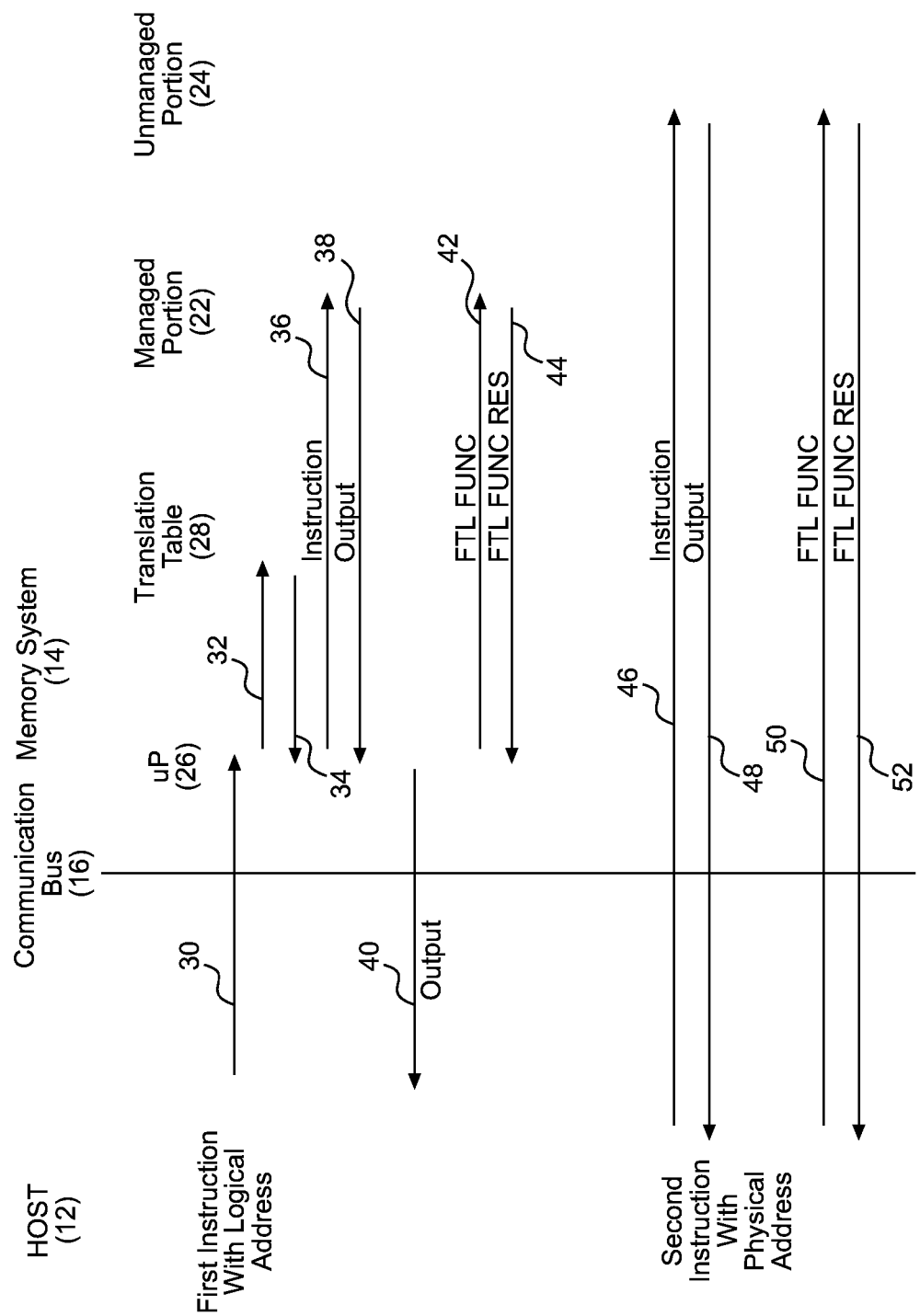
FIG. 2 is a signal flow diagram between the host and memory system of FIG. 1.

FIG. 2 is a signal flow diagram between the host 12 and the memory system 14 of FIG. 1. In this regard, the host 12 generates a first instruction 30 with a logical address and sends it to the memory system 14 via the communication bus 16 using a bus protocol. The first instruction 30 and logical address are received by the microprocessor 26. The microprocessor 26 requires translation of the logical address, so it sends address query 32 to the translation table 28, which responds with the physical address 34 to the microprocessor 26. The microprocessor 26 provides the instruction 36 to the managed portion 22 with the acquired physical address. Note that the instruction can be a read from or write to instruction. The managed portion 22 provides output 38 to the microprocessor 26, which passes the output 40 back to the host 12 using the communication bus 16 using the same bus protocol as the first instruction 30. When the microprocessor 26 and the managed portion 22 are not busy serving read/write requests, the microprocessor 26 may send the FTL function (FUNC) 42 to the managed portion 22 using the known physical address. The managed portion responds with a FTL FUNC response (RES) 44.

With continued reference to FIG. 2, the host 12 generates a second instruction with a physical address. Note that first and second are used herein to assist in differentiating the instructions and are not intended to imply a particular temporal order. As with the first instruction 30, the second instruction may be an instruction to read from or write to the memory system 14, although the second instruction is to read from or write to the unmanaged portion 24, and not to the managed portion 22. The host 12 sends the instruction 46 to the unmanaged portion 24, and the unmanaged portion 24 responds with output 48. Note that the instruction 46 is sent over the same communication bus 16 using the same bus protocol as the first instruction 30. When the host 12 and the unmanaged portion 24 are not busy serving read/write requests, the host 12 may send an FTL FUNC 50 to the unmanaged portion 24. The unmanaged portion 24 responds with an FTL FUNC RES 52.

Figure 3:
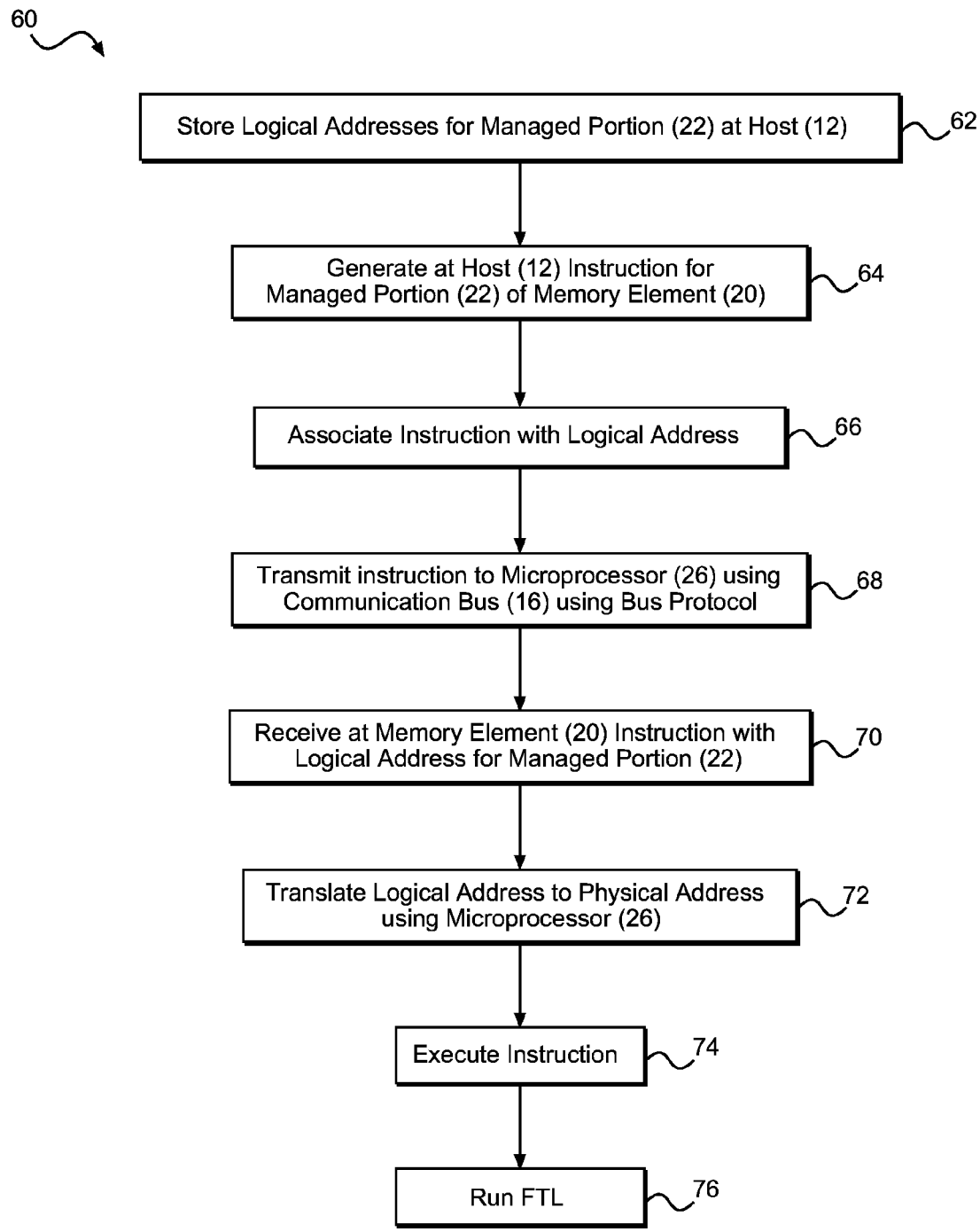
FIG. 3 is a flowchart illustrating an exemplary process for using a managed portion of a memory system according to an exemplary aspect of the present disclosure.

FIG. 3 is a flowchart illustrating an exemplary process 60 for using the managed portion 22 of the memory system 14 of FIG. 1 according to an exemplary aspect of the present disclosure. The process 60 starts with the host 12 storing the logical addresses for the managed portion 22 (block 62). Note that this storing may be done at device integration. Subsequently, the host 12 generates an instruction (e.g., the first instruction) for the managed portion 22 of the memory element 20 (block 64). The host 12 associates the instruction with the appropriate logical address (block 66). The host 12 then transmits the instruction to the microprocessor 26 using the communication bus 16 using the bus protocol (block 68). The memory element 20, and particularly the microprocessor 26, receives the instruction with the logical address for the managed portion 22 (block 70). The microprocessor 26 translates the logical address to the physical address by reference to the translation table 28 of FIG. 1 (block 72). The microprocessor 26 then sends the first instruction to the managed portion 22 using the acquired physical address and the instruction is executed (block 74). When the microprocessor 26 and the managed portion 22 are not busy executing the read/write instructions, the microprocessor runs FTL as needed (block 76). The process 60 allows for high throughput and device management for the bulk storage space while imposing relatively small management requirements on the host 12. However, these advantages are at the expense of comparatively high latency.

Figure 4:
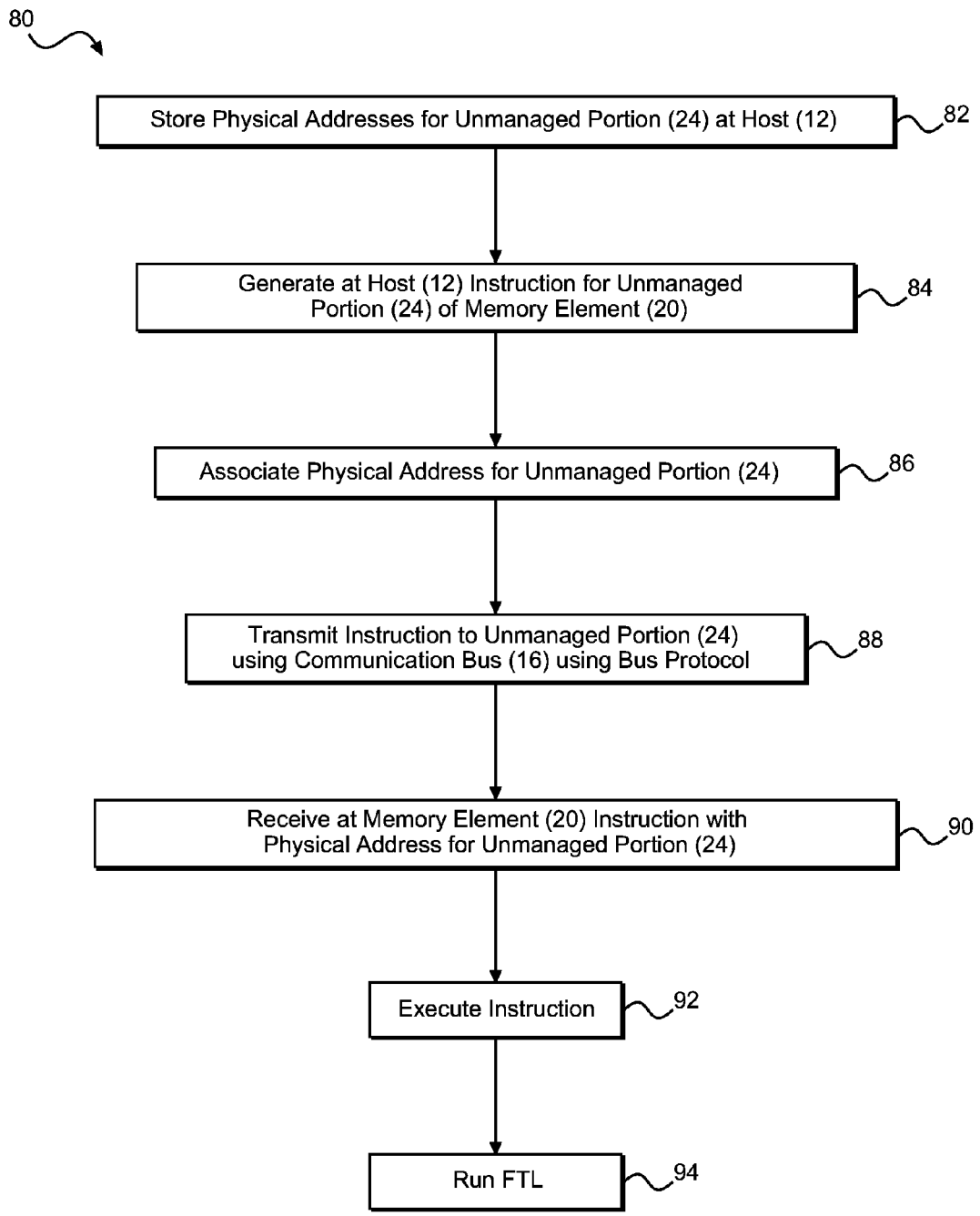
FIG. 4 is a flowchart illustrating an exemplary process for using an unmanaged portion of a memory system according to an exemplary aspect of the present disclosure.

Similarly, FIG. 4 is a flowchart illustrating an exemplary process 80 for using the unmanaged portion 24 of the memory system 14 of FIG. 1 according to an exemplary aspect of the present disclosure. The process 80 starts by storing the physical addresses for the unmanaged portion 24 at the host 12 (block 82). Note that this storing may be done at device integration. The host 12 generates an instruction (e.g., the second instruction) for the unmanaged portion 24 of the memory element 20 (block 84). The host 12 associates the physical address for the unmanaged portion 24 for the instruction (block 86). The host 12 transmits the instruction to the unmanaged portion 24 (block 88) using the same communication bus 16 using the same bus protocol as used for the instructions sent to the managed portion 22. The memory element 20 receives the instruction with the physical address for the unmanaged portion 24 (block 90). The unmanaged portion 24 executes the instruction (block 92). When the host 12 and the unmanaged portion 24 are not executing the instructions, the host 12 may run FTL as needed (block 94).

The bifurcated memory management for memory elements according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 5:
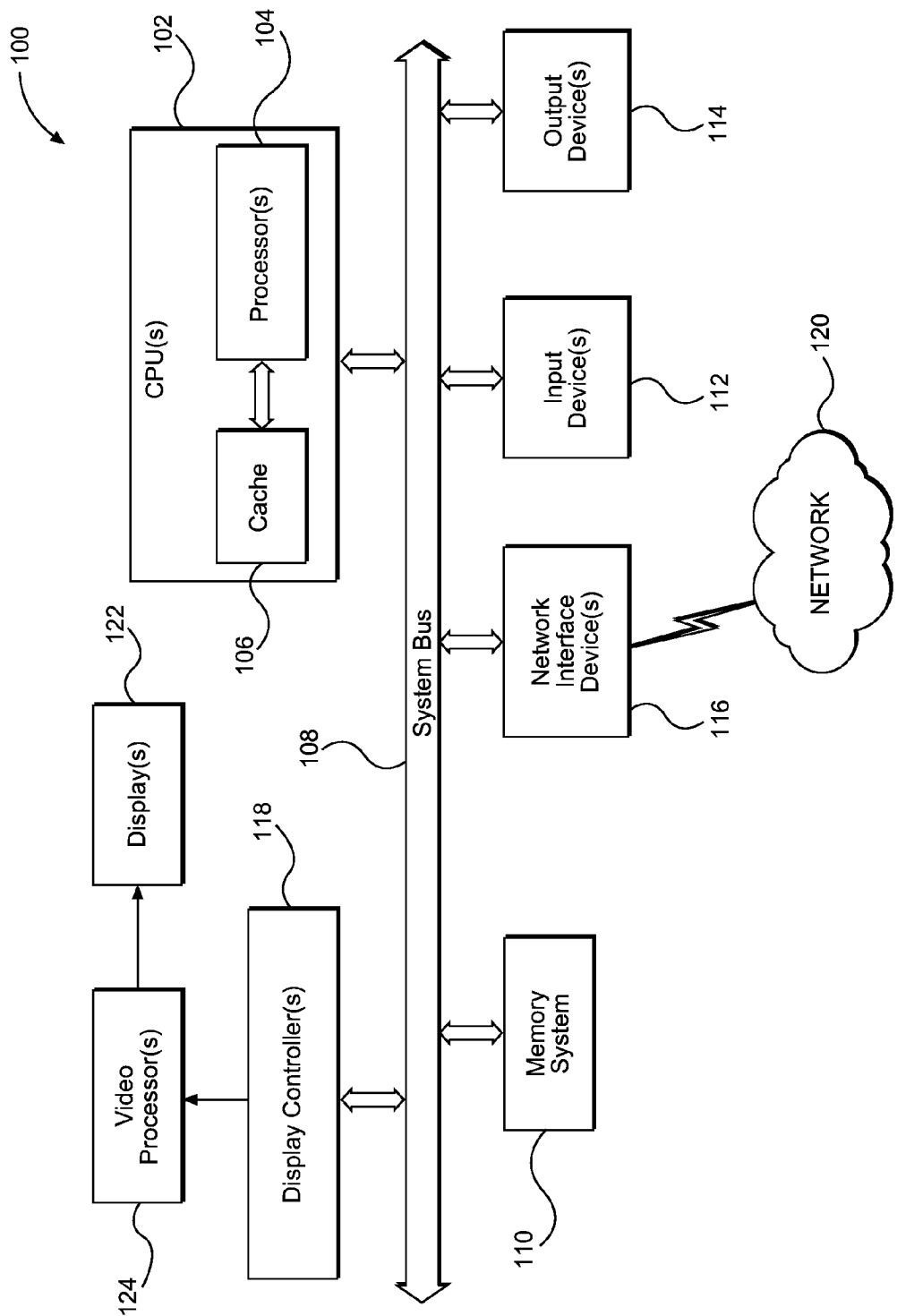
FIG. 5 is a block diagram of an exemplary processor-based system that can include the host and memory system of FIG. 1.

In this regard, FIG. 5 illustrates an example of a processor-based system 100 that can employ the host 12 and the memory system 14 illustrated in FIG. 1. In this example, the processor-based system 100 includes one or more central processing units (CPUs) 102, each including one or more processors 104. The CPU(s) 102 may be a host 12. The CPU(s) 102 may have cache memory 106 coupled to the processor(s) 104 for rapid access to temporarily stored data and/or storage of the logical and physical addresses. The CPU(s) 102 is coupled to a system bus 108 and can intercouple devices included in the processor-based system 100. The system bus 108 may be or may include the communication bus 16 illustrated in FIG. 1. As is well known, the CPU(s) 102 communicates with these other devices by exchanging address, control, and data information over the system bus 108. For example, the CPU(s) 102 may communicate instructions to a memory system 110, which may be the memory system 14 of FIG. 1.

Other devices can be connected to the system bus 108 or other buses. As illustrated in FIG. 5, these devices can include the memory system 110, one or more input devices 112, one or more output devices 114, one or more network interface devices 116, and one or more display controllers 118, as examples. The input device(s) 112 can include any type of input device, including, but not limited to, input keys, switches, voice processors, etc. The output device(s) 114 can include any type of output device, including, but not limited to, audio, video, other visual indicators, etc. The network interface device(s) 116 can be any devices configured to allow exchange of data to and from a network 120. The network 120 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 116 can be configured to support any type of communications protocol desired.

The CPU(s) 102 may also be configured to access the display controller(s) 118 over the system bus 108 to control information sent to one or more displays 122. The display controller(s) 118 sends information to the display(s) 122 to be displayed via one or more video processors 124, which process the information to be displayed into a format suitable for the display(s) 122. The display(s) 122 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of controlling a memory element, comprising:
   generating, at a host, a first instruction for a pre-defined managed portion of a memory element;
   associating the first instruction with a logical address of the memory element;
   transmitting the first instruction with the logical address to the pre-defined managed portion of the memory element through a communication bus using a bus protocol;
   generating, at the host, a second instruction for a pre-defined unmanaged portion of the memory element that is distinct from the pre-defined managed portion of the memory element;
   associating the second instruction with a physical address of the memory element; and
   transmitting the second instruction with the physical address to the pre-defined unmanaged portion of the memory element through the communication bus using the bus protocol.

2. The method of claim 1, further comprising executing a flash translation layer (FTL) for the pre-defined unmanaged portion of the memory element at the host.

3. The method of claim 1, further comprising, allowing the memory element to execute a FTL for the pre-defined managed portion of the memory element.

4. The method of claim 1, wherein generating the first instruction for the pre-defined managed portion of the memory element comprises generating the first instruction for a negative AND (NAND) flash memory element.

5. The method of claim 1, further comprising storing, at the host, a range of physical addresses for the pre-defined unmanaged portion of the memory element.

6. The method of claim 1, further comprising storing, at the host, a range of logical addresses for the pre-defined managed portion of the memory element.

7. The method of claim 1, wherein generating, at the host, the first instruction comprises generating a read or write access instruction.

8. A method of operation for a memory element, comprising:
   receiving, from a communication bus using a bus protocol, a first instruction from a host, the first instruction including a logical address for a pre-defined managed portion of a memory element; and
   receiving, from the communication bus using the bus protocol, a second instruction from the host, the second instruction including a physical address for a pre-defined unmanaged portion of the memory element that is distinct from the pre-defined managed portion of the memory element.

9. The method of claim 8, wherein the memory element comprises a negative AND (NAND) flash memory element.

10. The method of claim 8, further comprising executing, at the memory element, flash translation layer (FTL).

11. The method of claim 8, wherein receiving the second instruction comprises receiving an FTL command from the host for the pre-defined unmanaged portion of the memory element.

12. The method of claim 8, wherein the first instruction comprises a read or write access instruction.

13. A memory element comprising:
    a controller;
    a pre-defined first storage space configured to be managed by the controller and responsive to a first instruction received from a host including a logical address; and
    a pre-defined second storage space distinct from the pre-defined first storage space configured to be managed by the host remotely from a memory element and responsive to a second instruction received from the host including a physical address.

14. The memory element of claim 13, wherein the memory element is a negative AND (NAND) flash memory element.

15. The memory element of claim 13, further comprising a bus interface configured to be coupled to a communication bus.

16. The memory element of claim 15, wherein the bus interface is configured to pass instructions from the host directly to the second storage space.

17. A host comprising:
    a bus interface configured to be coupled to a communication bus;
    a transceiver operatively coupled to the bus interface; and
    a controller operatively coupled to the transceiver, the controller configured to:
    generate a first instruction for a pre-defined managed portion of a memory element;
    associate the first instruction with a logical address of the memory element;
    instruct the transceiver to transmit the first instruction with the logical address to the pre-defined managed portion of the memory element through the communication bus using a bus protocol;
    generate a second instruction for a pre-defined unmanaged portion of the memory element that is distinct from the pre-defined managed portion of the memory element;
    associate the second instruction with a physical address of the memory element; and
    instruct the transceiver to transmit the second instruction with the physical address to the pre-defined unmanaged portion of the memory element through the communication bus using the bus protocol.

18. The host of claim 17, wherein the controller is further configured to execute a flash translation layer (FTL) for the second instruction.

19. The host of claim 17, wherein the first instruction comprises one of a read or write access instruction.

20. The host of claim 17, wherein the controller is further configured to allow the memory element to execute a FTL for the pre-defined managed portion of the memory element.

21. The host of claim 17, wherein the first instruction for the pre-defined managed portion of the memory element comprises instruction for a negative AND (NAND) flash memory element.

22. The method of claim 1, further comprising limiting a burden on the host by only allocating the pre-defined unmanaged portion.

23. The method of claim 1, further comprising setting size and parameters of the pre-defined unmanaged portion.

24. The method of claim 1, further comprising setting size and parameters of the pre-defined unmanaged portion at device integration.

25. The method of claim 1, further comprising setting a majority portion of the memory element as managed.

26. The method of claim 8, further comprising providing data from a location within the pre-defined managed portion to the host in response to a read access instruction and writing data to the location within the pre-defined managed portion in response to a write access instruction.

27. The host of claim 19, wherein the controller is further configured to receive data stored in the memory element responsive to the first instruction.

* * * * *